United States Patent Office 2,800,489
Patented July 23, 1957

2,800,489

11-TRIFLUOROACETOXY STEROIDS AND PROCESS

Tadeus Reichstein, Basel, Switzerland

No Drawing. Application July 20, 1954,
Serial No. 444,658

Claims priority, application Switzerland August 14, 1953

9 Claims. (Cl. 260—397.1)

This invention relates to the manufacture of new esters of the steroid series, and more particularly to 11-trifluoracetoxy-steroids and the process for preparing same.

In steroid chemistry the esterification of hydroxyl groups plays an important part. This reaction is often employed for the temporary protection of a hydroxyl group, as for example in 3-position, the esterified hydroxyl group being subsequently again liberated by hydrolysis. In the case of steroids with a hydroxyl group in 11-position, the processes hitherto employed lead to unsatisfactory yields, on the one hand on account of the lack of reactivity of the 11β-hydroxyl group with respect to the customary esterifying agents, and on the other hand on account of the relative difficulty of hydrolysis of the 11-acyloxy compounds thereby produced.

The present invention is based on the observation that the above-mentioned disadvantages do not arise in the case of the trifluoracetates of 11-hydroxy-steroids. These compounds can be produced under mild conditions and can easily be hydrolyzed again.

The new esters of the present invention are obtained when 11-hydroxy-steroids are reacted, i. e. esterified with a trifluoracetylating agent, e. g., with trifluoracetic acid or its esterifying derivatives, such as trifluoracetic anhydride or trifluoracetyl halides as the trifluoracetyl chloride or bromide. The esterification process of the invention is carried out with trifluoracetic acid or its esterifying derivatives, especially the anhydride, preferably at room temperature. The process can be conducted in the presence of diluents, such as organic solvents, for example, ethers or halogenated hydrocarbons. The presence of catalysts, for example bases such as tertiary amines, for instance pyridine, is often also of advantage.

As starting materials all 11α- and 11β-hydroxy steroids are suitable. They may be of saturated or unsaturated nature, for example in 1-, 4-, 5-, 14- or 16-position or may contain further substituents, especially free or functionally converted hydroxyl, oxo or carboxyl groups, or halogen atoms, for example in 2-, 3-, 4-, 5-, 6-, 7-, 9-, 12-, 14-, 15-, 17-, 20- or 21-position.

A special feature of the 11-trifluoracetates obtainable according to the present process is their relative ease of hydrolysis. Thus it is possible to hydrolyze the 11-trifluoracetoxy group without attack upon other sensitive groupings, as for example the dihydroxy acetone side chain of 17α-hydroxy-corticosterone. The hydrolysis of the 11-trifluoracetates can be carried out at about 0° C. with acid or alkaline agents, for example with hydroxides and bicarbonates of sodium and potassium. The application of the present process is therefore of particular value when in a synthesis an intermediate protection of the 11-hydroxyl group is desired, as for example in the manufacture of corticosterone, 17α-hydroxy-corticosterone and analogous 11β-hydroxy-pregnane compounds. If the starting materials contain in addition to the 11-hydroxyl group a further free hydroxyl group, for example in 3-position, this is likewise esterified on treatment with trifluoracetic acid or its derivatives. It has been ascertained that the 3-trifluoracetoxy group is much more easily hydrolyzable than that in 11-position, for example this hydrolysis takes place under the action of water, so that it is easily possible partially to hydrolyze in 3-position the 3:11-ditrifluoracetates, especially the 3β:11β-ditrifluoracetates.

The products of the invention are intended for use as medicaments, and more particularly as intermediate products for the manufacture of medicaments, e. g. corticosterone and 17α-hydroxycorticosterone.

The following examples illustrate the invention, the relation between parts by weight and parts by volume being the same as that between the gram and the cubic centimeter:

*Example 1*

0.7 part by weight of $\Delta^4$-3-keto-11α-hydroxy-etiocholenic acid methyl ester is dissolved in 10 parts by volume of absolute dioxane and, after the addition of 1 part by volume of trifluoracetic anhydride, the whole allowed to stand for ½ hour at 22° C. The reaction mixture is then diluted with chloroform and ether (1:3), and washed with water, dilute sodium carbonate solution and with water. After drying over sodium sulfate and evaporation of the solvent, 0.96 part by weight is obtained of crude $\Delta^4$-3-keto-11α-trifluoracetoxy-etiocholenic acid methyl ester, which is dissolved in benzene and filtered through a little aluminum oxide and, after crystallization from a mixture of ether and petroleum ether, melts at 116–117° C., $[\alpha]_D^{20} = +118.5° \pm 2°$ (c.=1.241 in chloroform).

In an analogous manner it is possible to start from the free acid:

0.78 part by weight of $\Delta^4$-3-keto-11α-hydroxy-etiocholenic acid is dissolved in 10 parts by volume of absolute dioxane and with 1 part by volume of trifluoracetic anhydride is left to stand for ½ hour at 22° C. After the addition of 3 parts by volume of water, the whole is left to stand for 1 hour at 22° C., taken up in chloroform and ether, and, after being washed with water, is dried over sodium sulfate and evaporated. 0.24 part by weight of the residue—crude $\Delta^4$-3-keto-11α - trifluoracetoxy - etiocholenic acid—is esterified with ethereal diazomethane solution. The crude product is dissolved in benzene, filtered through a little aluminum oxide and after evaporation of the benzene the residue is recrystallized from a mixture of ether and petroleum ether. The methyl ester thus obtained is identical with that described above.

The $\Delta^4$-3-keto-11α-trifluoracetoxy etiocholenic acid can be converted into the 11-epi-corticosterone-21-monoacetate as follows:

0.82 part by weight of $\Delta^4$-3-keto-11α-trifluoracetoxy-etiocholenic acid is dissolved in 20 parts by volume of absolute benzene, mixed with 3 parts by volume of oxalyl-chloride in 80 parts by volume of absolute benzene at 5° C. and then left to stand for 20 minutes at 20° C. The whole is then evaporated in vacuo, the residue dissolved in 40 parts by volume of absolute benzene, added at 0° C. a dry solution of about 2 parts by weight of diazomethane in about 100 parts by volume of absolute ether and left to stand for 1½ hours at 22° C. The whole is then evaporated in vacuo and the residue comprising 11-α-trifluoracetoxy-21-diazo-progesterone, is chromatographed over 20 parts by weight of aluminum oxide. 0.65 part by weight of the pale yellow resin elutriable with benzene and mixtures of benzene and ether, is dissolved in 80 parts by volume of methanol, mixed with 2 parts by weight of potassium bicarbonate in 40 parts by volume of water and left to stand for 2 days at 22° C. The methanol is then removed in vacuo and the residue is extracted with chloroform and ether (1:3). The extracts washed with water and dried over sodium sulfate yield on evaporation in vacuo 0.45 part by weight of 11-α-hydroxy-21-diazo-progesterone, which after recrystallization from a mixture of acetone and ether melts at 135–137° C. 0.4 part by weight of the crude product is heated with 10 parts by volume of glacial acetic acid for ½ hour at 100–105° C. The whole is then evaporated in vacuo and the residue dissolved in absolute benzene is filtered through a little aluminum oxide. The evaporated filtrate is crystallized from a mixture of acetone and ether. 11-epi-corticosterone-21-monoacetate melting at 156–160° C. is obtained.

*Example 2*

0.76 part by weight of 3β:11β-dihydroxy-etioallo-cholanic acid methyl ester and 3 parts by volume of trifluoracetic anhydride are allowed to stand for 16 hours at 20° C. The whole is then taken up in ether and the ethereal solution washed with sodium carbonate solution and water, dried over sodium sulfate and evaporated. There is obtained 0.9 part by weight of 3β:11β-ditrifluoracetoxy-etioallo-cholanic acid methyl ester, which after crystallization from a mixture of ether and petroleum ether melts at 132–134° C., $[\alpha]_D^{20} = +55.4° \pm 1.5°$ (c.=1.715 in chloroform).

The same product is obtained when 0.3 gram of the above specified starting material is mixed at 0° C. with 5 parts by volume of pyridine and 3 parts by volume of trifluoracetic anhydride and the reaction mixture allowed to stand for 4 hours at 20° C.

In an analogous manner the 3β-acetoxy-11β-hydroxy-etioallo-cholanic acid methyl ester can be converted into the 3β-acetoxy-11β-trifluoracetoxy-etioallo-cholanic acid methyl ester.

The partial hydrolysis of the 3β:11β-ditrifluoracetoxy-etioallocholanic acid methyl ester can for example be carried out as follows:

0.51 part by weight of 3β:11β-ditrifluoracetoxy-etioallocholanic acid methyl ester is dissolved in 80 parts by volume of methanol, mixed with a solution of 2 parts by weight of potassium bicarbonate in 60 parts by volume of water and allowed to stand for 2 days at 20° C. The methanol is then removed in vacuo and the residue extracted with ether. The ethereal solution washed with water and dried over sodium sulfate is evaporated. The residue is the 3β - hydroxy - 11β - trifluoracetoxy-etioallocholanic acid methyl ester, which after recrystallization from a mixture of ether and petroleum ether melts at 124–126° C.

From this substance, after hydrolysis of the ester group and acetylation of the hydroxyl group in 3-position, 3β-acetoxy-11β-trifluoracetoxy-etioallocholanic acid can be obtained which may be converted into 3β:21-diacetoxy-11β-hydroxy - 20 - keto - allo - pregnene according to the method described in the following example.

*Example 3*

1.02 parts by weight of 3β-acetoxy-11β-hydroxy-etioallocholanic acid are mixed with 10 parts by volume of pyridine and 5 parts by volume of trifluoracetic anhydride at 0° C. and then allowed to stand for 4 hours at 24° C. After the addition of 10 parts by volume of dioxane and 5 parts by volume of water the whole is allowed to stand for a further 2 hours. Dilute hydrochloric acid is then added and the whole extracted with a mixture of chloroform and ether. After washing with water, drying and evaporating the solvent there is obtained 3β-acetoxy-11β-trifluoracetoxy-etioallocholanic acid. It can for example be converted into 3β:21-diacetoxy-11β-hydroxy-20-keto-allopregnane by conversion into the diazoketone, hydrolysis of the acyloxy groups, heating with glacial acetic acid and acetylation as follows:

1.21 parts by weight of 3β-acetoxy-11β-trifluoracetoxy-etioallocholanic acid are dried by evaporation with absolute benzene in vacuo, dissolved in 30 parts by volume of absolute benzene, mixed with 3 parts by volume of oxalyl chloride in 20 parts by volume of benzene at 5° C. and then allowed to stand for 20 minutes at 20° C. The whole is then evaporated in vacuo, the residue dissolved in 50 parts by volume of absolute benzene and at —15° C. entered into a distilled solution of about 2 parts by weight of diazomethane in 100 parts by volume of ether which has been dried over potassium hydroxide and then dried over sodium wire and the whole allowed to stand for 1½ hours at 24° C. After evaporation in vacuo there is obtained the crude 3β-acetoxy-11β-trifluoracetoxy-etioallocholanic acid diazoketone. It is allowed to stand with a solution of 1.5 parts by weight of potassium hydroxide in 80 parts by volume of methanol for 16 hours at 25° C. After the addition of water the methanol is removed in vacuo and the residue is extracted with a mixture of chloroform and ether (1:3). After evaporation of the solution which has been washed with water and dried over sodium sulfate there is obtained the 3β:11β-dihydroxy-etioallocholanic acid diazoketone, 0.8 part by weight of which is heated with 10 parts by volume of glacial acetic acid for ½ hour at 100–105° C. The whole is then evaporated in vacuo and the crude 3β:11β-dihydroxy-20-keto-allo-pregnane-21-monoacetate is allowed to stand with 4 parts by volume of absolute pyridine and 2 parts by volume of acetic anhydride for 16 hours at 20° C. After working up in the usual way and chromatographing the crude product over 30 parts by weight of aluminum oxide and eluting with a mixture of benzene and petroleum ether, there is obtained 3β:21-diacetoxy-11β-hydroxy-20-keto-allo-pregnane which after recrystallization from a mixture of acetone and ether melts at 170–172° C.

*Example 4*

0.88 part by weight of Δ⁴-11β-hydroxy-3-ketoetiocholenic acid is dissolved in 5 parts by volume of dioxane, mixed with 2 parts by volume of trifluoracetic anhydride and allowed to stand for 18 hours at 22° C. 4 parts by volume of water are then added and the whole left to stand for a further 2 hours. The whole is then extracted with a mixture of chloroform and ether (1:3) and the solution of chloroform and ether washed with water, dried over sodium sulfate and evaporated. There is obtained Δ⁴-11β-trifluoracetoxy-3-keto-etiocholenic acid.

The latter may be converted into corticosterone-21-monoacetate as follows:

1.6 parts by weight of the acid are converted into 11β-trifluoroacetoxy-21-diazo-progesterone in the same manner as that described in Example 3. The latter is then dissolved in 40 parts by volume of methanol, 1.6 parts by weight of potash in 16 parts by volume of water are then added and the whole is allowed to stand for 16 hours at 22° C. in an evacuated sealed tube. The whole is then diluted with water, the methanol removed in vacuo and the suspension extracted with a mixture of chloroform and ether (1:3). After the solution of chloroform and ether has been washed with water and dried over sodium sulfate there is left on evaporation 11β-hydroxy-21-diazo-progesterone. 0.7 part by weight of the latter is heated with 5 parts by volume of glacial acetic acid and the crude corticosterone-21-monoacetate formed is chromatographed over 20 parts by weight of aluminum oxide. The corticosterone-21-monoacetate is eluted with benzene and a mixture of benzene and ether containing up to 10% ether. After recrystallization several times from a mixture of acetone and ether and petroleum ether the product melts at 141–144° C.

*Example 5*

3 parts by weight of Δ⁴-11β:17α-dihydroxy-21-acetoxy-3:20-diketo-pregnene are allowed to stand in 20 parts by volume of dioxane with 6 parts by volume of trifluoracetic anhydride for 16 hours at 20° C. After taking up in a mixture of ether and chloroform (3:1), washing the solution with a solution of sodium carbonate and water, drying over sodium sulfate and evaporation there is obtained a crude product. It is purified by partial hydrolysis with a solution of potassium bicarbonate in aqueous methanol at 20° C. in the same manner as that described in Example 2 and finally acetylated in 21-position. The product obtained after the usual working up is chromatographed over aluminum oxide, and then eluted with a mixture of benzene and ether with about 10% ether content to give Δ⁴-17α-hydroxy-11β-trifluoracetoxy-21-acetoxy-3:20-diketo-pregnene with the specific rotation $[\alpha]_D^{25} = +134:3° \pm 2°$ )c.=1.571 in chloroform), from which there may be obtained by hydrolysis, for example with potassium carbonate in aqueous methanol with exclusion of oxygen Δ⁴-11β:17α:21-trihydroxy-3:20-diketo-pregnene melting at 220° C. with specific rotation $[\alpha]_D = +167°$.

Example 6

3 parts by weight of 3α:11β:17α-trihydroxy-20-keto-pregnane and 16 parts by volume of trifluoracetic anhydride are allowed to stand for 16 hours at 20° C. The whole is then taken up in a mixture of ether and chloroform (3:1), the solution of ether and chloroform is washed with a solution of sodium carbonate and water, dried over sodium sulfate and evaporated. There is obtained 3α:11β:17α-tri-trifluoracetoxy - 20 - keto-pregnane. The latter can be converted into Δ⁴-11β:17α:21-trihydroxy-3:20-diketo-pregnene as follows:

0.5 part by weight of 3α:11β:17α-tri-trifluoracetoxy-20-keto-pregnane with a solution of potassium bicarbonate in a mixture of methanol and water is partially hydrolyzed in the same manner as that described in Example 2 to 3α:17α - dihydroxy - 11β-trifluoracetoxy-20-keto-pregnane and worked up. The latter is converted in the usual manner by bromination in 21-position and acetoxylation into the 3α:17α-dihydroxy-11β-trifluoracetoxy-21-acetoxy-20-keto-pregnane, from which there is obtained by oxidation with N-bromosuccinimide or chromic acid the 17α-hydroxy - 11β - trifluoracetoxy - 21 - acetoxy - 3:20 -di-keto-pregnane. By usual bromination in 4-position, splitting off of hydrogen bromide using semi carbazide-hydrochloride and splitting the semi carbazone with pyruvic acid there is obtained the Δ⁴-17α-hydroxy-11β-trifluoracetoxy - 21 - acetoxy-3:20-diketo-pregnene ($[\alpha]_D^{25} = +134.3° \pm 2°$ (c.=1.571 in chloroform)) described in Example 5, which can be converted by mild hydrolysis into Δ⁴ - 11β:17α:21 - trihydroxy - 3:20 - diketo - pregnene melting at 220° with specific rotation $[\alpha]_D = +167°$.

What is claimed is:

1. A process which comprises treating a member selected from the group consisting of compounds of the formula:

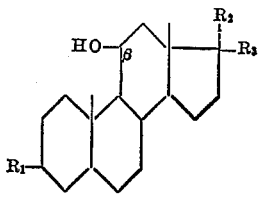

and the corresponding compounds containing a double bond extending from the 5-carbon atom, wherein $R_1$ is a member selected from the group consisting of a free hydroxyl group, a hydroxyl group esterified with a lower aliphatic carboxylic acid and an oxo group, $R_2$ is a member selected from the group consisting of hydrogen and a hydroxyl group and $R_3$ a member selected from the group consisting of a free carboxyl group and a carboxyl group esterified with a lower aliphatic alcohol, an acetyl group, a free hydroxyacetyl group and a hydroxyacetyl group esterified with a lower aliphatic carboxylic acid, with trifluoracetic acid anhydride under anhydrous conditions to convert the 11β-hydroxy-group into the 11β-trifluoracetyl group.

2. A process as set forth in claim 1 wherein the esterification is carried out in the presence of a catalyst.

3. A process as set forth in claim 1, wherein the 11β-hydroxy-steroids of the pregnane series are converted into their 11β-trifluoracetates.

4. A member selected from the group consisting of compounds of the formula:

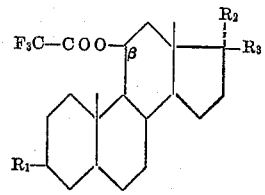

and the corresponding compounds containing a double bond extending from the 5-carbon atom, wherein $R_1$ is a member selected from the group consisting of a free hydroxyl group, a hydroxyl group esterified with trifluoracetic acid, a hydroxyl group esterified with a lower aliphatic carboxylic acid and an oxo group, $R_2$ is a member selected from the group consisting of hydrogen, a hydroxyl group and a hydroxyl group esterified with trifluoracetic acid and $R_3$ a member selected from the group consisting of a free carboxyl group and a carboxyl group esterified with a lower aliphatic alcohol, an acetyl group, a free hydroxyacetyl group, a hydroxyacetyl group esterified with trifluoracetic acid and a hydroxyacetyl group esterified with a lower aliphatic carboxylic acid.

5. 3α:17α-dihydroxy - 11β - trifluoroacetoxy - 20 - keto-pregnane.

6. 3α:17α - dihydroxy - 11β - trifluoracetoxy - 21 - acetoxy-20-keto-pregnane.

7. 3β:11β - ditrifluoracetoxy - etioallo - cholanic acid methyl ester.

8. 3β - acetoxy - 11β - trifluoracetoxy - etioallo - cholanic acid.

9. Δ⁴-11β-trifluoracetoxy-3-keto-etio-cholenic acid.

References Cited in the file of this patent

UNITED STATES PATENTS

| | | |
|---|---|---|
| 2,183,589 | Reichstein | Dec. 19, 1939 |
| 2,602,769 | Murray | July 8, 1952 |
| 2,660,586 | Murray | Nov. 24, 1953 |
| 2,666,070 | Murray | Jan. 12, 1954 |
| 2,666,071 | Murray | Jan. 12, 1954 |
| 2,671,093 | Lincoln | Mar. 2, 1954 |
| 2,671,094 | Lincoln | Mar. 2, 1954 |
| 2,686,792 | Murray | Aug. 17, 1954 |
| 2,691,030 | Murray | Oct. 5, 1954 |
| 2,691,031 | Murray | Oct. 5, 1954 |
| 2,695,907 | Murray | Nov. 30, 1954 |

OTHER REFERENCES

Fieser et al.: Natural Products Related to Phenanthrene, 3rd ed., pp. 408, 424–426 (1949).